United States Patent [19]
Keller et al.

[11] Patent Number: 5,547,110
[45] Date of Patent: Aug. 20, 1996

[54] METERING DEVICE FOR FLUIDS

[75] Inventors: Wilhelm A. Keller, Obstgartenweg 9, CH-6402 Merlischachen, Switzerland; Laurence R. Penn, Northants, Great Britain

[73] Assignee: Wilhelm A. Keller, Merlischachen, Switzerland

[21] Appl. No.: 317,595

[22] Filed: Oct. 3, 1994

[30] Foreign Application Priority Data

Oct. 1, 1993 [EP] European Pat. Off. ............ 93810696

[51] Int. Cl.[6] ...................................................... G01F 11/22
[52] U.S. Cl. ........................ 222/219; 222/135; 251/172; 251/174
[58] Field of Search ........................... 222/135, 216–219, 222/224, 249, 368; 251/172, 174

[56] References Cited

U.S. PATENT DOCUMENTS

| | | | |
|---|---|---|---|
| 71,865 | 12/1867 | Fitzgerald | 222/249 X |
| 1,049,478 | 1/1913 | Hedgcock | 222/219 |
| 2,424,675 | 7/1947 | Wood | 222/368 |
| 3,037,738 | 6/1962 | Jackson et al. | 251/172 |
| 3,125,136 | 3/1964 | Miller et al. | 222/219 X |
| 3,167,398 | 1/1965 | Whittington | 222/219 X |
| 3,172,578 | 3/1965 | Kemp | 222/219 |
| 3,387,748 | 6/1968 | Brenchley | 222/219 X |
| 3,398,763 | 8/1968 | Richards | 251/172 X |
| 3,561,727 | 2/1971 | Scaramucci | 251/172 |
| 3,749,357 | 7/1973 | Fowler | 251/172 |
| 4,058,240 | 11/1977 | Becker | 222/368 |
| 4,479,513 | 10/1984 | Koch et al. | 251/172 X |
| 4,773,565 | 9/1988 | Rohlfing et al. | 222/219 X |
| 5,368,195 | 11/1994 | Pleet et al. | 222/219 X |

FOREIGN PATENT DOCUMENTS

| | | | |
|---|---|---|---|
| 262289 | 10/1959 | Australia | 222/219 |
| 0200961 | 12/1986 | European Pat. Off. | |
| 0434149 | 6/1991 | European Pat. Off. | |
| 421532 | 12/1910 | France | 222/218 |
| 4220659 | 1/1993 | Germany | 222/219 |
| 2024158 | 1/1980 | United Kingdom | |
| WO90/10198 | 9/1990 | WIPO | |

*Primary Examiner*—Kevin P. Shaver
*Attorney, Agent, or Firm*—Marks & Murase L.L.P.

[57] ABSTRACT

The metering device comprises a housing, defining at least one inlet for the material to be metered and at least one outlet for that material, and at least one rotatable ball driven by a shaft, the ball having a transverse bore containing a shuttling ball moving linearly in the bore between two seats and seals against the one or the other seat. The rotatable ball is captured between the seats and seals under pressure against the outlet seat. Such a metering device allows an exact metering, in shot or rapid shot resulting in near continuous flow form, has great simplicity of construction with few working parts such as that it may easily be placed at the dispensing end of a pressure transfer system for liquids and gases and acts as shut off valve between metering use such that it prevents stalled hydrostatic fluid pressure behind the metering device from causing a flow surge ahead of the metering device at start up.

7 Claims, 9 Drawing Sheets

METERING DEVICE FOR FLUIDS

BACKGROUND OF THE INVENTION

The present invention relates to a metering device for fluids.

Such a device is known from the PCT Publication WO 90/10198, disclosing a linear movement metering head within an elongated rotatable member. This device suffers from sealing problems and due to its linear design, is relatively bulky for some applications. U.S. Pat. No. 4,058,240 discloses an automatic drain for compressed air system with a rotating ball, said ball however having no throughgoing bore.

SUMMARY OF THE INVENTION

Starting from this prior art, it is the object of the present invention to provide a metering device which allows an exact metering and solves, in a simple manner, the sealing problems of the rotatable member, and offers additional advantages in relation to the device disclosed in the above mentioned prior art application, namely that in addition it can be used for the metering of gases as well as for a wide range of liquids.

This problem is solved with a device according to which the rotatable member is a ball having at least one transverse bore and at least one drive shaft, said rotatable ball being held captive between two seats opposed to each other, each seat having a passage for inlet and outlet flow respectively. In a preferred embodiment the inlet and outlet seats are spherical, which reduces considerably the sealing problems and allows a compact design of the metering device.

BRIEF DESCRIPTION OF THE DRAWINGS

The invention will be explained hereinafter, by way of example, with reference to the accompanying drawings, in which.

DETAILED DESCRIPTION OF THE INVENTION

Figure 1:
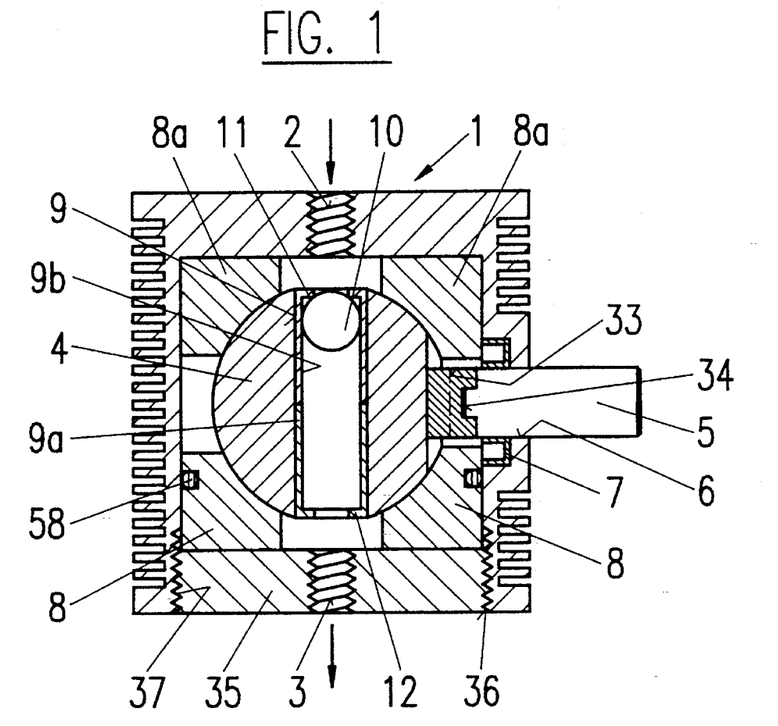
FIG. 1 shows schematically a section of a device according to the invention.

FIG. 1 shows schematically a first embodiment of a metering device with a housing 1, having an inlet port 2 and diametrically opposed an outlet port 3. The inlet port is connected to a supply and the outlet port to a dispensing apparatus. The metering member is a spherical, rotatable member, preferable a ball 4 which is coupled to a drive shaft 5 e.g. by a keyway shaft coupling 33. This shaft is held in a bearing 6 with an appropriate seal 7. A drive system such as an electric motor and gear box and the electric controls for driving the rotatable ball can be conventional, resp. the same as in the prior art document.

It is preferable for the correct function that there is a spherical seat 8 for the rotatable ball at the outlet side, forming a seal and which is achieved at less cost and is more durable and effective than the seal of the prior art rotatable member, whilst the inlet seat 8a may also be spherical. The rotatable ball has a transverse bore 9 in which it is advantageous to install a cylindrical sleeve 9a with an inner bore 9b and comprising seats 11 and 12 for the metering means on each end. This sleeve may be made of any appropriate material enabling an easy forming of the seats. The metering means of this embodiment is a shuttling ball 10 sliding between the metering means seats 11 and 12 in sleeve bore 9b.

When a liquid or gas is introduced at the inlet 2 under pressure the rotatable ball is held between the seats but because of the pressure, it is pressed against the outlet seat 8. As a result, any change of pressure of the liquid or gas is self compensating in relation to sealing against the outlet seat. The outlet seat 8 must be sealed vis-a-vis the housing, e.g. by a seal 58 or other sealing means. Furthermore, this system allows compensation for wear of the rotatable ball and its seats. The flow of liquid or gas can also serve for cooling any heat build up due to friction of the rotatable ball assembly against the seats.

The outlet seat 8 may be pressed against the rotatable ball by an adjusting screw. To this end the housing may comprise a closure 35 with an external thread 36 fitting in an internal thread 37 at the housing.

Figure 2:
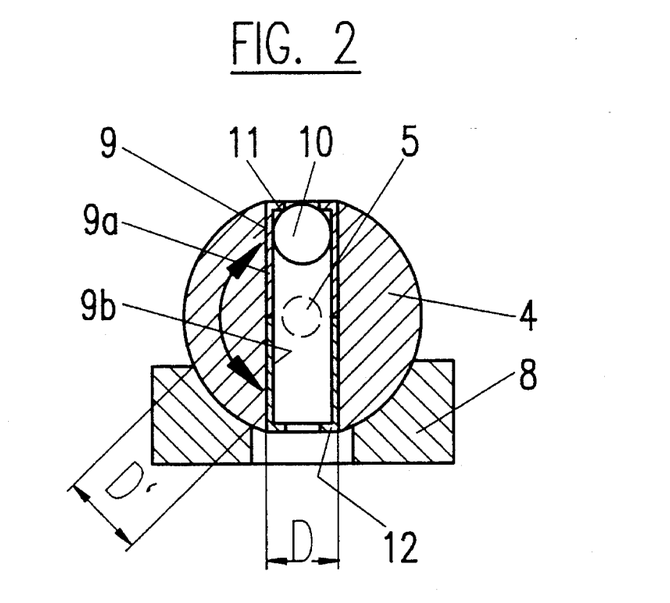
FIG. 2 shows a section at 90° of FIG. 1 of a detail.

It follows from FIG. 2 that the length D' of the outlet seat 8 in contact with the rotatable ball must exceed the diameter D of transverse bore 9, in order to prevent leakage as the bore 9 rotates past the outlet seat 8. It also follows that a pressure differential must exist between the inlet and the outlet side of the rotatable ball in order that the full movement of the shuttling ball is ensured between the seats for perfect metering and sealing.

The operation of the device of FIG. 1 is as follows: The material to be metered impinges under pressure via inlet 2 on shuttling ball 10 and pushes it from the seat 11 and down sleeve bore 9b to the second seat 12, expelling a dose of material. After a rotation of approximately 180° the same situation as in FIG. 1 is presented and the shuttling ball will again be pushed down the sleeve bore against the other seat, where it seals, having metered and expelled a new shot. With a rotational speed of 500 rpm and an expelling volume in sleeve bore 9b of 0.25 ml, a flow rate of 250 ml per minute is achieved. Both the relatively small volume and the rapidity of the metered shot combine to form an apparent uninterrupted flow. Interrupted or shot flow can be achieved by rotating the rotatable ball in 180° increments with subsequent pause.

It is appreciated that such a metering device has the capacity to work in a great range of parameters, such as low to high viscosity liquids, liquid properties of anti-lubrification and abrasiveness, variable flow rates and pressures.

The above mentioned example results in a cube-like housing of about 50 mm length of side with a rotatable ball diameter of about 25 mm, a shuttling ball diameter of about 6 mm, and a stroke of about 9 mm. This demonstrates clearly the compactness of the efficient metering device. Depending on the size of the device, the characteristics of the substances to be metered, the flow rates and the pressure employed, different materials for the rotatable ball and its seat can be used. If very low wear and high resistance to chemical substances are needed, ceramics can be used, and for small high precision devices, sapphire or ruby. Otherwise, steel or plastic material may be used.

Figure 3:
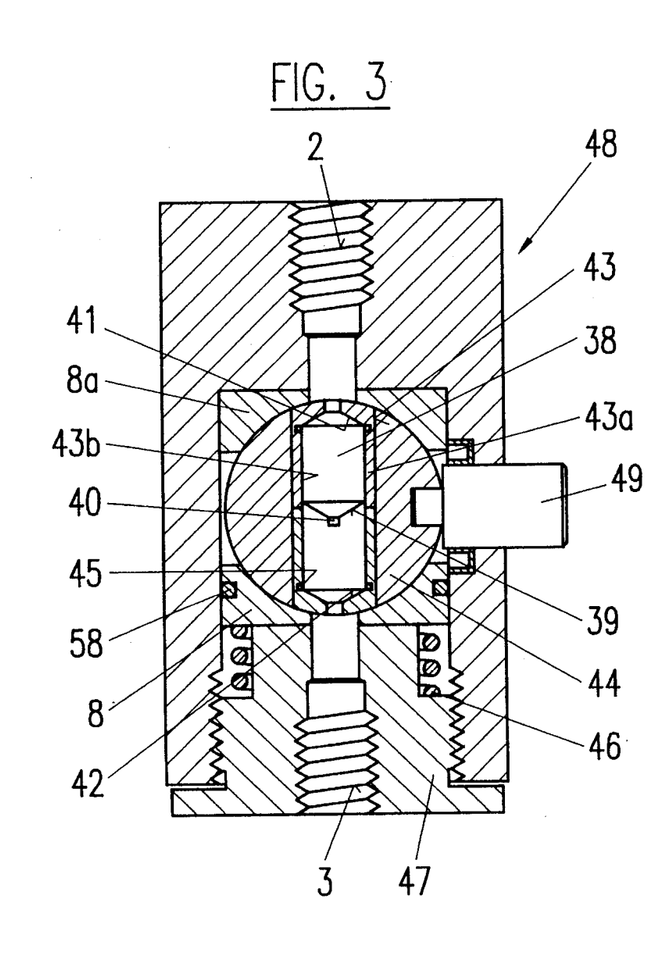
FIG. 3 shows a section of a second embodiment of the invention.

In FIG. 3 is shown a variant to FIG. 1 which is particularly suited for metering gas or any other compressible fluid. The shuttling ball is replaced by a shuttling cylindrical piston 38 having tapered ends 39 ending in a short cylinder 40, matching the contours of the corresponding seats 41, respectively 42 at sleeve 43a with its bore 43b and installed in bore 43 of rotatable ball 44 and further comprising a sealing means, e.g. a sealing ring 45 at each seat. The outside contour of the seats is matched to the spherical shape of the rotatable ball. In this variant the outlet seat 8 is pressed against the rotatable ball by a spring 46 located between the outlet seat 8 and the screw-in closure 47. The housing 48 is shown schematically, also the inlet 2 and outlet 3. There is, like in FIG. 1, only one drive shaft 49 which is not keyed, but rigidly attached directly to the rotatable ball, since the outlet seat 8 of the rotatable ball is screw/spring tensioned.

In operation, gas pressure originating from the inlet moves the piston towards seat 42 filling the resulting cylindrical space as the piston moves forward until it is stopped at the outlet sleeve seat 42. The rotatable ball is then rotated approximately 180° and the piston, moving to the opposite seat, ejects the gas. When all gas has been expelled from the cylindrical space through the outlet 3, the piston fills the cylindrical space and is flush with the contour of the seat. Thus when the ball is rotated a further 180°, the flush area within the seat does not carry any volume of gas back to the inlet area 2. The amount of the gas metered from the inlet to the outlet is directly related to the gas pressure in the inlet and the maintaining of a lesser pressure in the outlet area relative to the inlet area.

Figure 4:
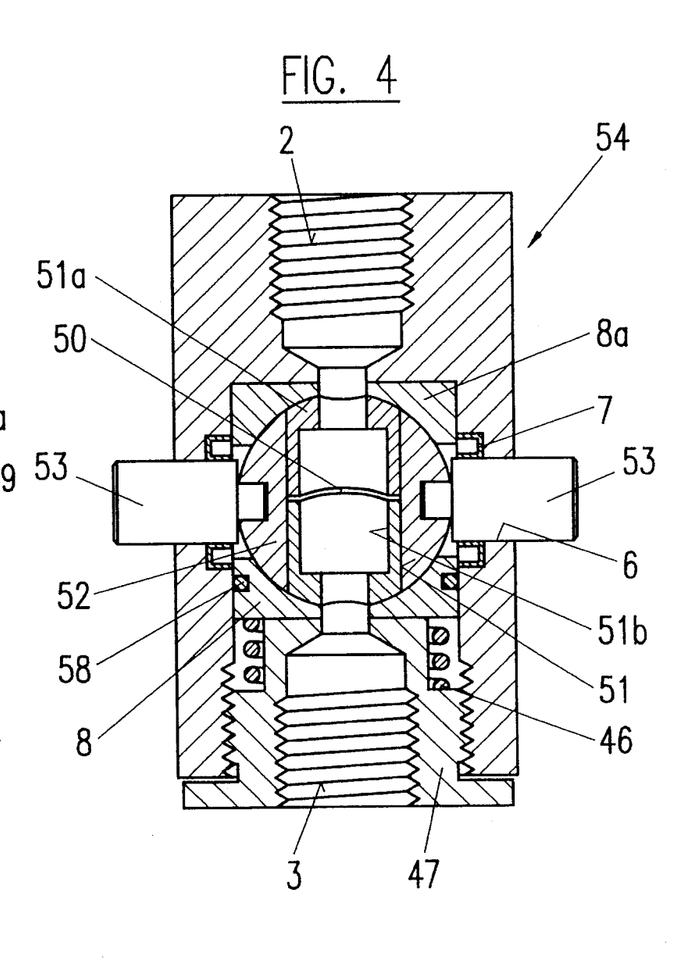
FIG. 4 shows a section of a third embodiment of the invention.

The embodiment of FIG. 4 shows another variant of the metering means, a diaphragm 50, fixed by retaining means in the middle of bore 51b of sleeve 51a installed in the transverse bore 51 of the rotatable ball 52, which ball is seated in the same seats 8, 8a as in the previous embodiments, seat 8 being screw/spring tensioned as in FIG. 3. It is obvious that bore 51b of the sleeve needs no seats. The rotatable ball 52 is supported by two directly attached shafts 53, one of it being driven. The housing 54 is similar to the housing 48 of FIG. 3 and also the other components. This embodiment works analogous to the previous described embodiments.

Figure 5:
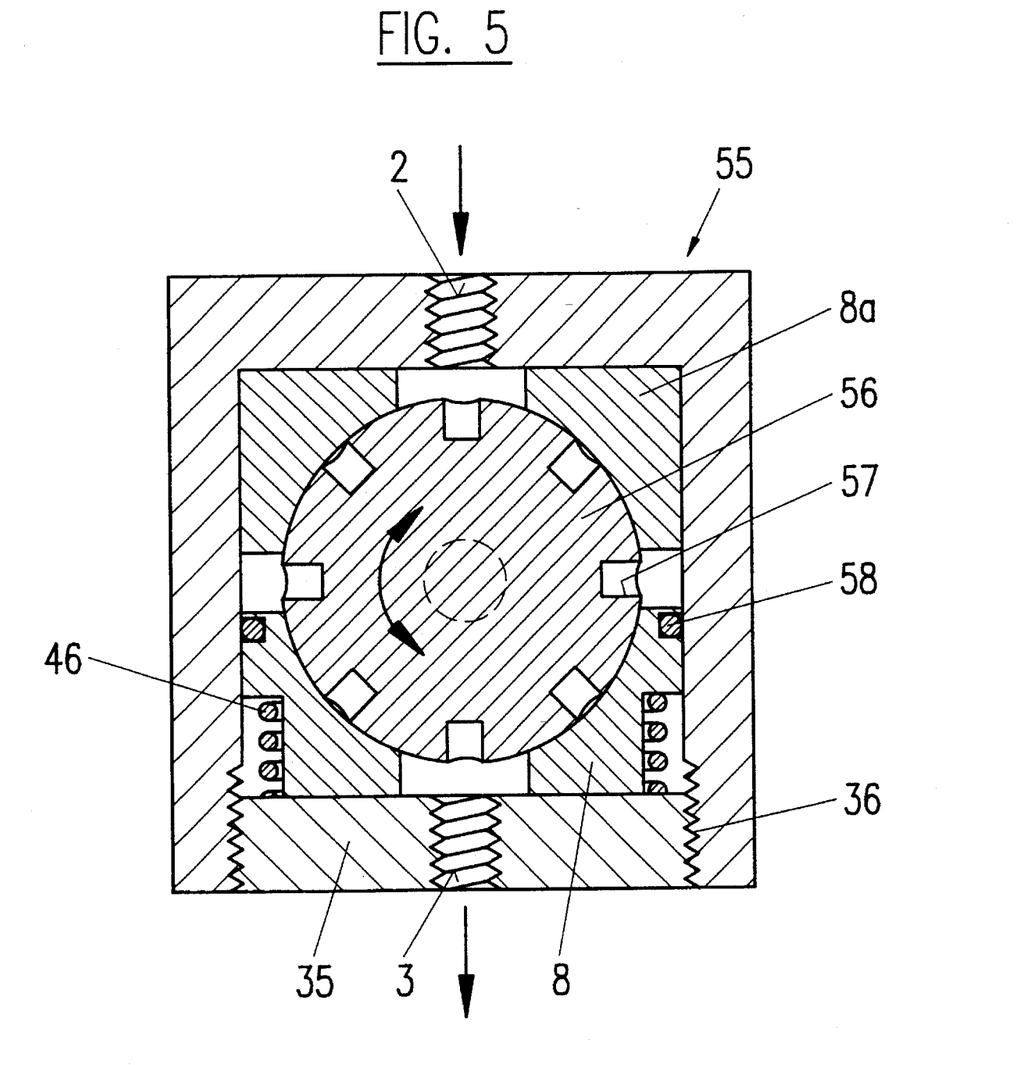
FIG. 5 shows a section of a fourth embodiment of the invention particularly suited for compressible fluids.

FIG. 5 shows a different embodiment 55 specially suitable for metering of compressible fluids in which the driven, rotatable ball 56 comprises a number of cavities 57 on its equatorial periphery formed as pocket holes for the transport of a small volume from inlet 2 to outlet 3. The seats 8 and 8a are similar to those of the previous embodiment, seat 8 also is screw/spring tensioned with means described above. The outlet seat 8 is sealed vis-à-vis the housing by sealing means 58.

Figure 6:
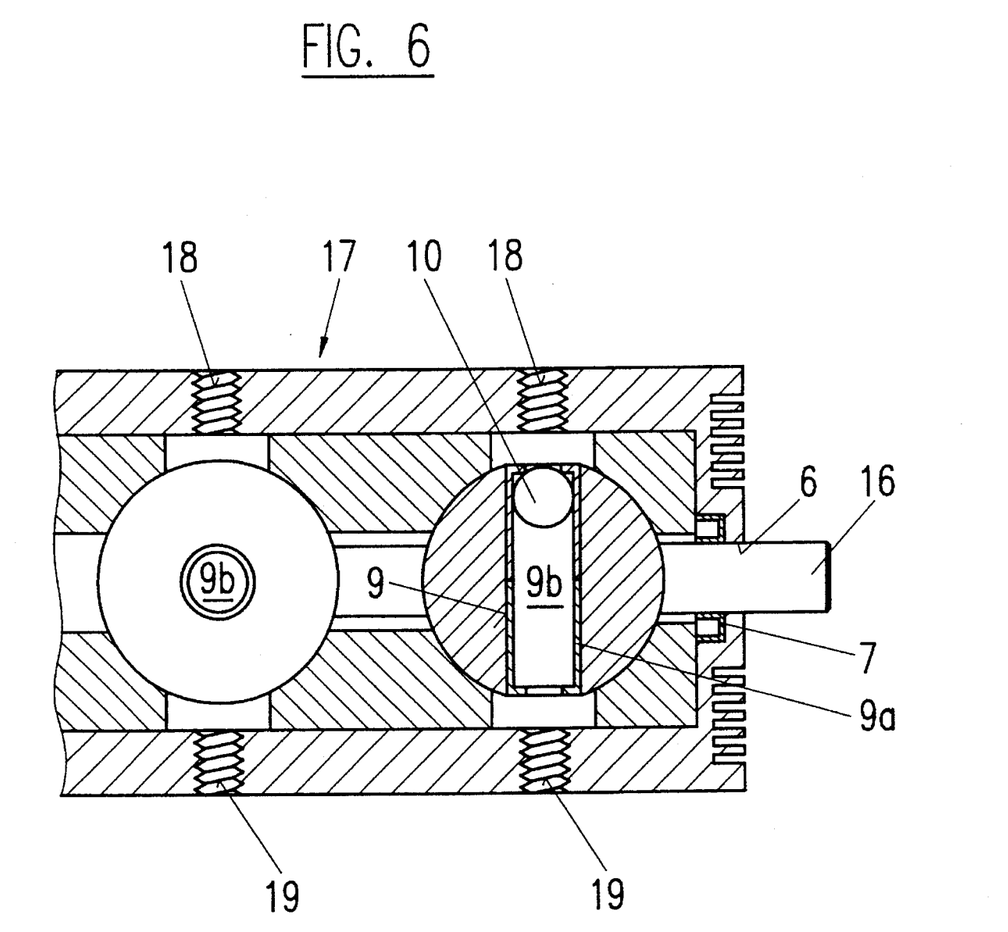
FIG. 6 shows a section of a further embodiment of the invention with two metering units.

FIG. 6 shows an embodiment in which the metering capacity has been doubled at the same time providing a more even and continuous flow by employing two rotatable balls 13 and 14 with a shuttling ball 10 in each, sliding in sleeve bore 9b between equal seats 11 and 12, the two transverse bores 9 being arranged at a 90° angle. The two rotatable balls 13 and 14 are connected by a connecting piece 15 and one rotatable ball 13 is driven by the drive shaft 16, being provided with bearing 6 and seal 7.

Housing 17 has two inlets 18 and two outlets 19. It is evident that also in this case the inlet pressure must be maintained above, and preferably with a safety factor, the required outlet pressure. It will be further appreciated that the invention, resp. the metering device is not limited to one or two rotatable balls. Therefore, the number of inlets and outlets may vary and the transverse bores may be arranged at an angle of 180°/N, if N is the number of rotatable members.

Figure 8:
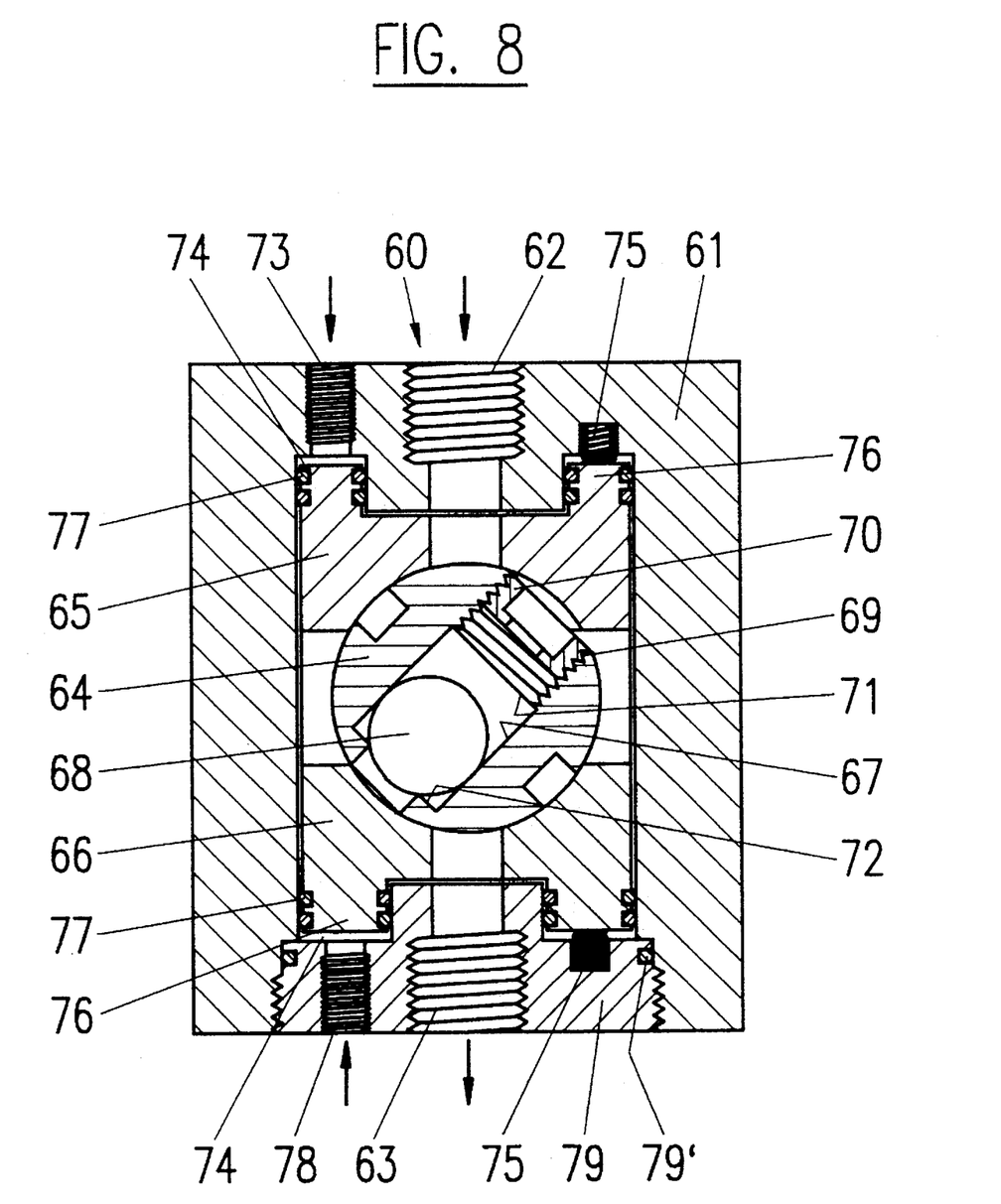
FIG. 8 shows a variant of a further embodiment of the invention.

FIG. 8 shows more detail of the sealing of the inlet and outlet spherical seats against a rotatable ball, wherein the inlet and outlet spherical seats are forced against the rotatable ball by independant fluid pressure. The embodiment 60 comprises a housing 61, having an inlet port 62 and diametrically opposed an outlet port 63, whereby inlet port 62 is connected to a supply and outlet port 63 to a dispensing apparatus. The rotatable ball 64 is held by the two spherical seats 65 and 66 and comprises the transverse bore 67 with two seats for the metering means, shuttling ball 68. As a variant transverse bore 67 has a partial thread 69 with an adjusting screw 70 such that the position of seat 71 may be adjusted from zero shuttle ball movement up to a maximum movement, whereas seat 72 is fixed. This variant can be used for all embodiments, independently of the number of bores.

In difference to the afore described embodiments the spherical seats 65 and 66 are under independant fluid pressure. Inlet spherical seat 65 is situated inside housing 61 which comprises a ring-shaped groove 74 with a fluid inlet port 73 and spring means 75. Inlet spherical seat 65 has a corresponding ring 76 reaching into the groove 74 forming an annular piston and further comprising sealing means 77.

Outlet spherical seat 66 has the same structure as inlet spherical seat 65 with the difference that the part 79 of the housing comprising sealing means 79', fluid inlet port 78 and the spring means 75 is fixed to the housing by thread or other means for containing the spherical seats.

The pressure on the spherical seats being proportional to the thrust against spherical sealing surface areas, such surface areas being equal or different and said fluid pressures being equal or different according to the effects of the liquid or gas pressure within the metering assembly and the need to seal and position the rotatable ball within those spherical seats. The spring means 75 are shown for pretensioning of the spherical seats against the rotatable ball prior to fluid tensioning.

It can be appreciated that the pressure on the spherical seats need not be necessarily independant, the pressure of the material to be dispensed may be used and be sufficient.

FIGS. 9–16 cover further embodiments of the invention whereby the rotatable ball has more than one transverse bore for metering. In order for this to be achieved without leakage through those bores, the seal which is placed between the inlet spherical seat and the housing provides this necessary additional function. The pressurized liquid or gas to be metered through the inlet port presses against the inlet spherical seat face area, causing the inlet spherical seat to be forced against the rotatable ball resulting in a sealing action between that seal and the ball in addition to the sealing action of the ball against the outlet spherical seat. Furthermore, and in respect to the above, the joint line between such inlet and outlet spherical seats may be other than parallel to the inlet and outlet walls, in particular placed close to a diagonal, yet allowing for a sealing means between that joint and the housing, such that any potential leakage between that joint line is not able to flow through the transverse bores to the outlet port when a transverse bore is adjacent to the joint line.

In the embodiment of FIGS. 9–12 a variant of the independant, or/and material input flow pressure on the seats as shown in the foregoing embodiment is disclosed wherein side B is the bottom of the device. The embodiment 80 comprises a housing 81, having an inlet port 82 and diametrically opposed an outlet port 83, whereby inlet port 82 is connected to a supply and outlet port 83 to a dispensing apparatus. The rotatable ball 84 is held by the two approximately diagonal divided spherical seats 85 and 86 and comprises two transverse bores 87 and 88, with the same seats as in the previous embodiment, for the two metering means, shuttling balls 89 and 90. In this embodiment the two bores meeting at the center of the rotatable ball.

Figure 9:
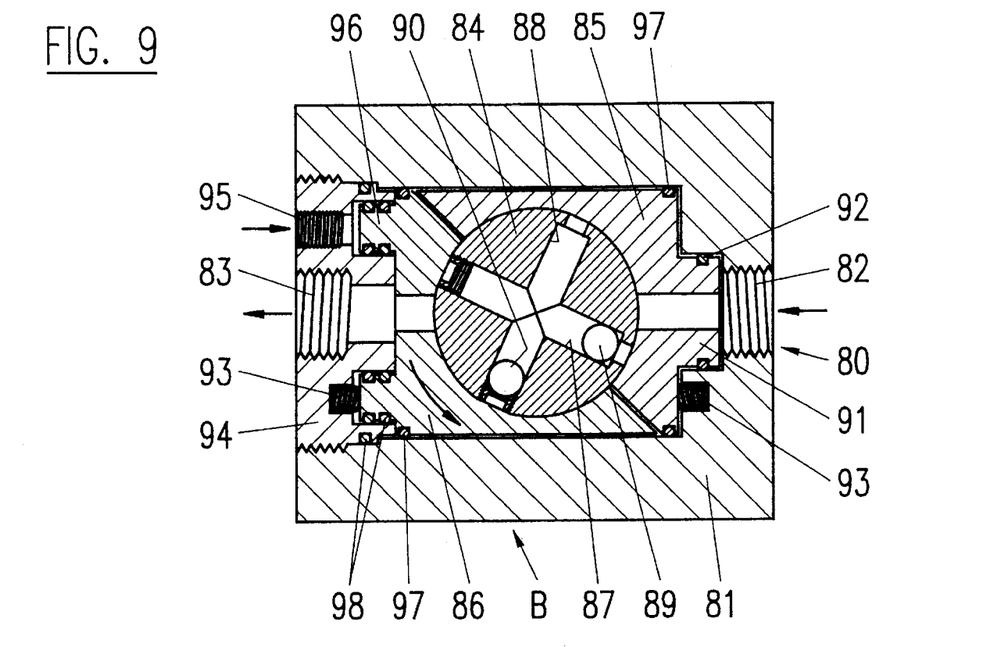
FIGS. 9–12 show four positions of a further embodiment of the invention with a rotatable ball having two transverse bores.
Figure 10:
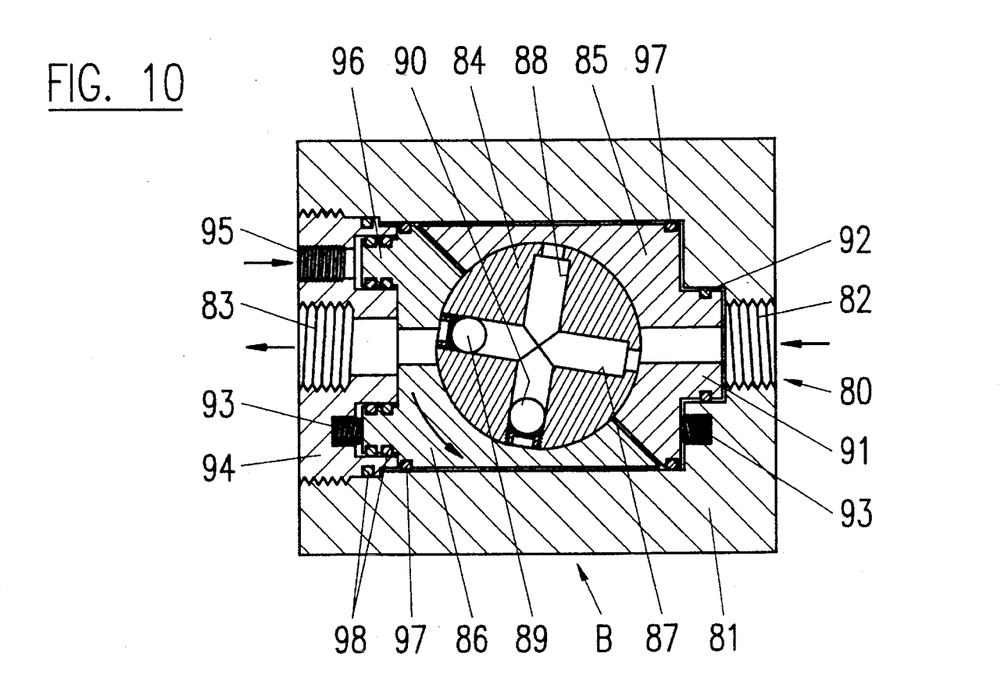
Figure 11:
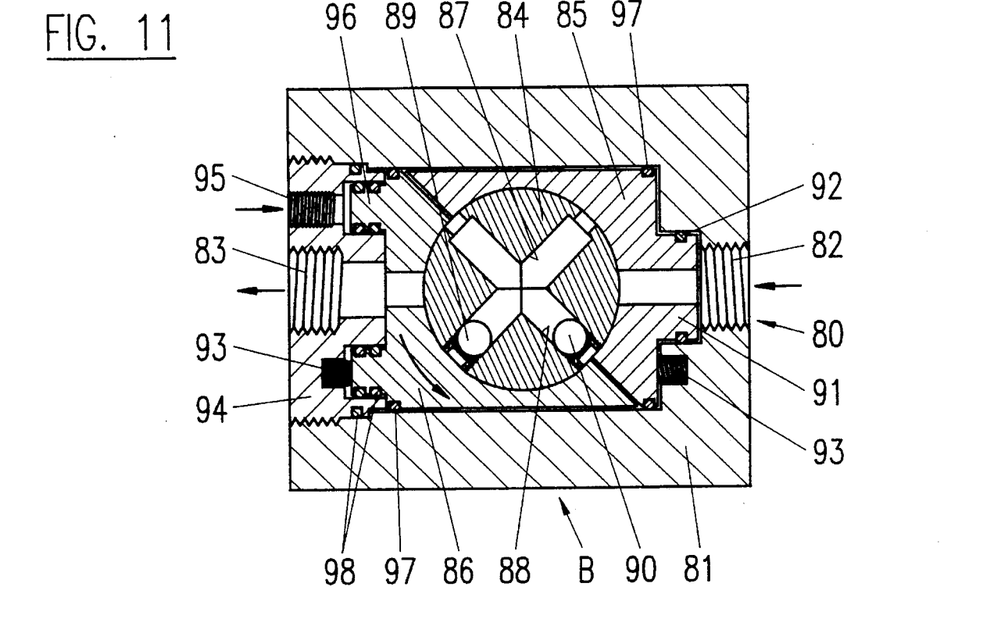
Figure 12:
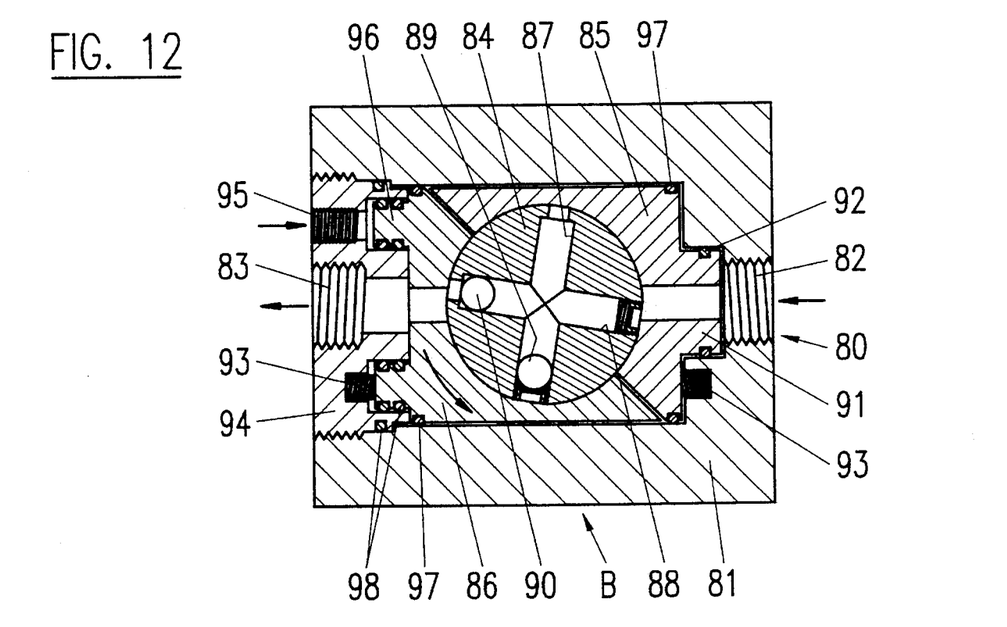

In difference to the embodiment of FIG. 8 inlet spherical seat 85 is provided, at the inlet port 82, with a piston 91 having a smaller diameter than the diameter of the inlet spherical seat and being subjected to the liquid or gas pressure at that inlet and further comprising a sealing means 92. The inlet spherical seat is also pre-tensioned by spring means 93 located inside housing 81. The insertable housing part 94 at the outlet spherical seat 86 is similar to the housing part of the previous embodiment, comprising fluid inlet port 95, and spring means 93, and thus also the corresponding portion of the outlet spherical seat 86 with ring 96 and sealing means 98. Each spherical seat further comprises a sealing means 97 to the housing.

The outlet spherical seat 86 may be pressurised through fluid inlet port 95 which is connected either to the inlet pressure fluid or to an independant fluid pressure means. Such a force is directly proportional to the liquid or gas pressure through the inlet port. The provision of pressure means for each spherical seat enables an exact adjustment of the pressure force, whereby pressure control means may be provided at fluid inlet port 95. Another adjustment means is provided by adapting the cross-sectional area of piston 91. Any such combination being to form a seal between the spherical seats and the rotatable ball. It is appreciated that this pressure means of the spherical seats may be also applied to the previous embodiments The FIGS. 9–12 show four different phases of a rotation of the rotatable ball, whereby the sense of rotation is given by the arrow. The sense of rotation is important in this embodiment since it must be assured that the metering member is always pressed against the seat.

Figure 13:
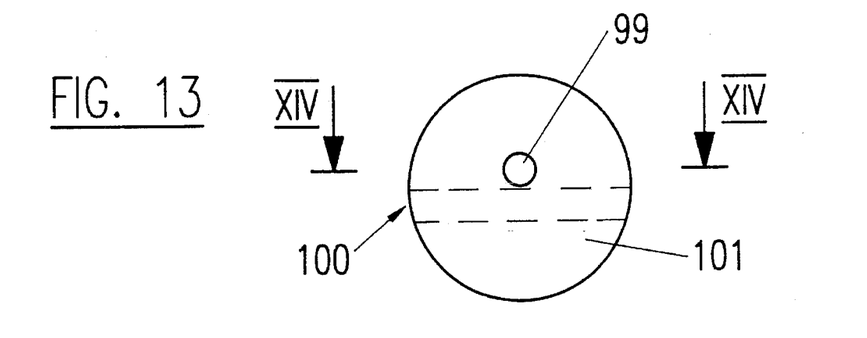
FIG. 13 shows a variant to the embodiment with the rotatable ball having two off-centered transverse bores.
Figure 14:
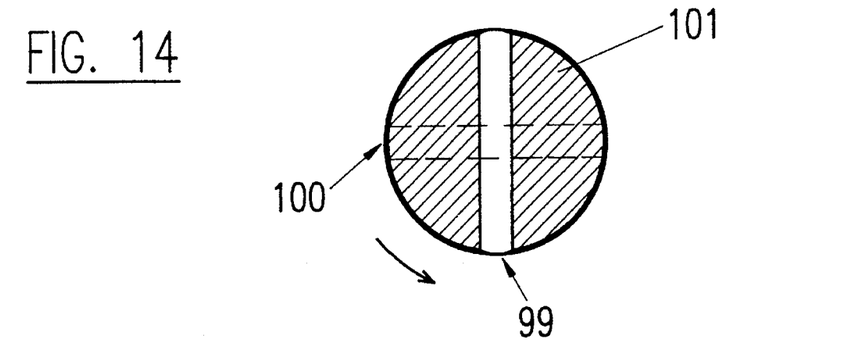
FIG. 14 shows a section according to line XIV—XIV in FIG. 13.
Figure 15:
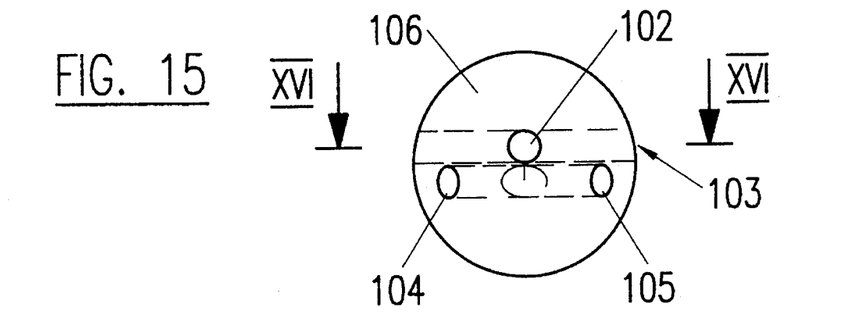
FIG. 15 shows a further embodiment of the invention with a rotatable ball having two pairs of transverse bores.
Figure 16:
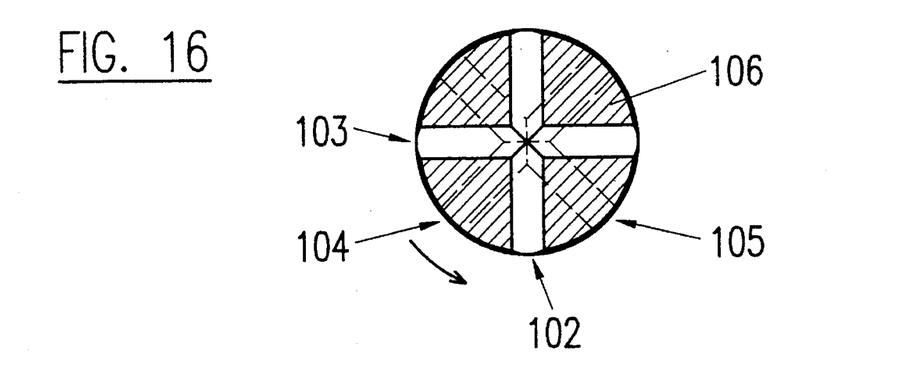
FIG. 16 shows a section according to line XVI—XVI in FIG. 15.

Another embodiment according to FIGS. 13 and 14 uses two transverse bores 99, 100 at ninety degrees to each other and off centre within the rotatable ball 101. In the embodiment of FIGS. 15 and 16 one pair of bores 102, 103 arranged at 90° is at 45° to a second off centered pair of 90° related bores 104, 105 within rotatable ball 106.

As a result of all the above an increased volume of metered output per rotatable ball cycle may be achieved. For example, two transverse bores provide four metered outputs per cycle, and four transverse bores eight metered outputs per cycle. This is advantageous in decreasing pulsation and lowering potential component wear relative to revolution speeds.

Figure 7:
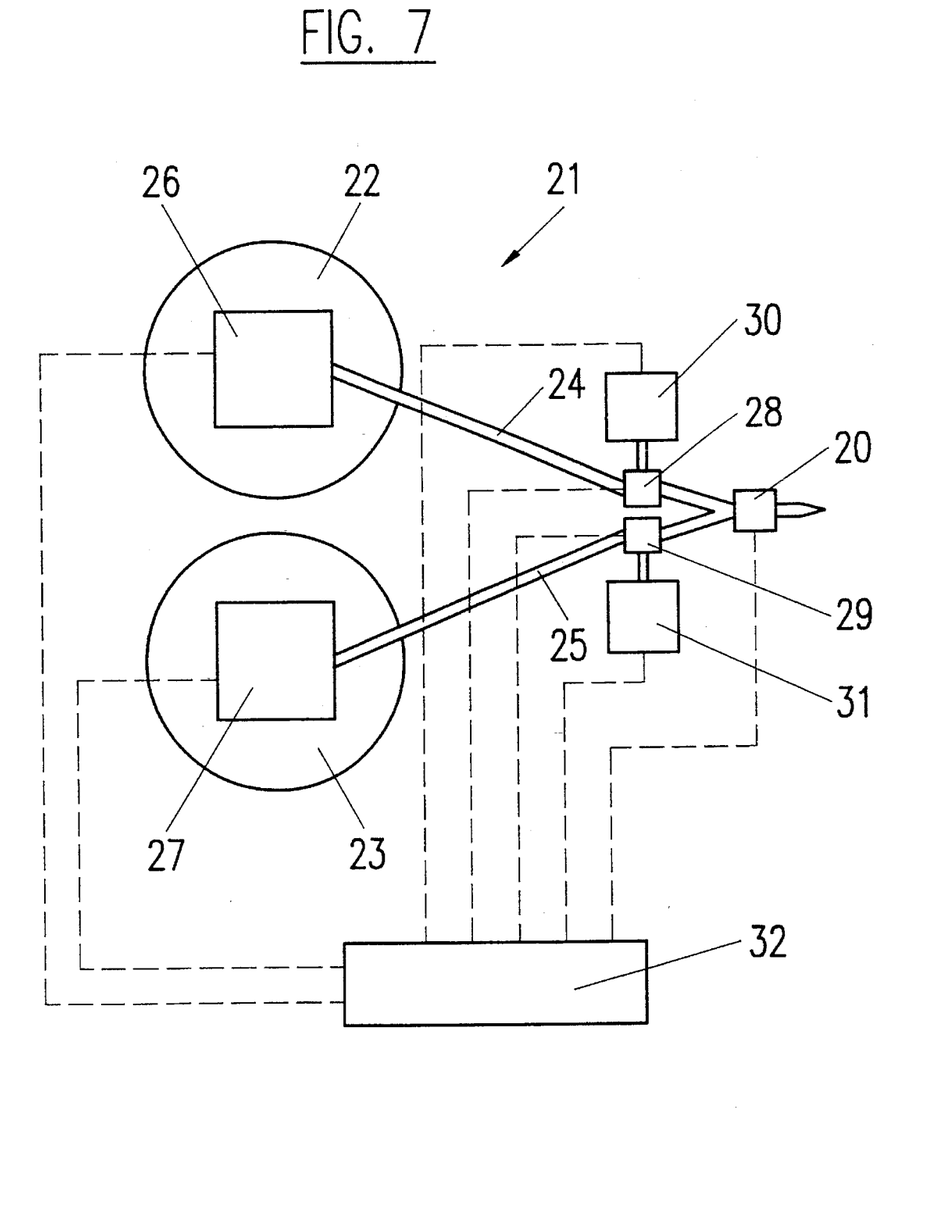
FIG. 7 shows an use of the invention in a layout for a two component proportioning and mixing apparatus.

FIG. 7 shows schematically a possible application of two metering devices of the invention in a proportioning and mixing apparatus 21 for a two component material. Numerals 22 and 23 indicate two storage containers for the two components. Pipes 24 and 25 are connected to pumps 26 and 27 or other pressure sources. The pumps transport the material under pressure to metering devices 28 and 29, the outlets thereof being attached to a mixing device 20, which can be of the static or dynamic type. The electric motors 30 and 31 of the metering devices as well as the metering devices themselves are connected to and controlled by a computerized control unit 32, which controls also the storage containers, the pumps or other pressure sources, as well as the mixing device in case it is an electrically driven mixing device. It is evident that the pressure of the pumps or other pressure sources as well as the delivery of the metering devices can be different one from another, and that the electric parameters can be adjusted and varied.

It follows from the above description that the devices of the invention are less complex, relatively more compact and smaller in size and have relatively lower wear than known devices. They are self adjusting or may be adjusted against wear and completely sealing against leakage during rotation, thus providing optimum metering accuracy as well as acting as a perfect shut off valve in any angular position when rotation has stopped and metering has ceased.

Furthermore, such a metering device allows an exact metering of fluids, in shot or flow form, has great simplicity of construction with few working parts such as that it may easily be placed in a pressure transfer system for liquids and gases.

We claim:

1. A metering device for fluids, comprising a housing having at least one inlet and at least one outlet for fluids to be metered, and at least one rotatable member comprising metering means, wherein the rotatable member is a ball having at least one transverse bore containing the metering means and at least one drive shaft, the rotatable member being captured between two seats opposed to each other, each seat having at least one passage for one of inlet and outlet flow of said fluids;

wherein the rotatable member comprises more than one transverse bore, each bore containing one metering means; and wherein two transverse bores are arranged at 90° and off-center within the rotatable member.

2. A metering device for fluids, comprising a housing having at least one inlet and at least one outlet for fluids to be metered, and at least one rotatable member comprising metering means, wherein the rotatable member is a ball having at least one transverse bore containing the metering means and at least one drive shaft, the rotatable member being captured between two seats opposed to each other, each seat having at least one passage for one of inlet and outlet flow of said fluids;

wherein the rotatable member comprises more than one transverse bore, each bore containing one metering means; and wherein the rotatable member comprises one pair of transverse bores arranged at 90°, said pair being at approximately 45° and off-center to a second pair of transverse bores also off-center and arranged at 90°.

3. A metering device for fluids, comprising a housing having at least one inlet and at least one outlet for fluids to be metered, and at least one rotatable member comprising metering means, wherein the rotatable member is a ball having at least one transverse bore containing the metering means and at least one drive shaft, the rotatable member being captured between two seats opposed to each other, each seat having at least one passage for one of inlet and outlet flow of said fluids;

wherein the rotatable member comprises more than one transverse bore, each bore containing one metering means; and     wherein the two seats are pressed by fluid pressure means against the rotatable member whereby at least a side of one of said seats providing outlet flow comprises an annular shaped piston facing a groove formed by an inserted housing part comprising a fluid outlet port.

4. A metering device according to claim 3, wherein a side of one of said seats providing inlet flow comprises an annular shaped piston facing a groove formed by an inserted housing part comprising a fluid inlet port.

5. A metering device according to claim 3, wherein a side of one of said seats providing inlet flow comprises a piston facing the inlet of said housing.

6. A metering device according to claim 3, wherein each of said seats has a side which includes pretensioning spring means.

7. At least two metering devices in a multi-component proportioning and mixing apparatus, in which the metering devices are fed independently by fluids from corresponding pressure sources and their outlets are connected to a mixing device, storage containers, and pressure sources, the metering devices including their drives and the mixing device, when electrically driven, being individually controlled by a computerized control unit;

each of said at least two metering devices comprising a housing having at least one inlet and at least one outlet for fluids to be metered, and at least one rotatable member comprising metering means, wherein the rotatable member is a ball having at least one transverse bore containing the metering means and at least one drive shaft, the rotatable member being captured between two seats opposed to each other, each seat having at least one passage for one of inlet and outlet flow of said fluids,     wherein each of said at least two metering devices further includes means for adjusting at least one of said two seats.

\* \* \* \* \*